United States Patent
Sommerfeld

[11] Patent Number: 5,983,731
[45] Date of Patent: Nov. 16, 1999

[54] LOAD TRANSDUCER

[75] Inventor: Jodi L. Sommerfeld, Bloomington, Minn.

[73] Assignee: MTS Systems Corporation, Eden Prairie, Minn.

[21] Appl. No.: 09/088,868

[22] Filed: Jun. 2, 1998

[51] Int. Cl.[6] .................................................. G01L 5/00
[52] U.S. Cl. ................................................................ 73/862
[58] Field of Search ........................ 73/862.632, 862.635, 73/862.637, 862.642, 723, 726, 715

[56] References Cited

U.S. PATENT DOCUMENTS

| | | | |
|---|---|---|---|
| 3,151,480 | 10/1964 | Schultz | 73/862.635 X |
| 3,261,203 | 7/1966 | Young | 73/141 |
| 3,407,652 | 10/1968 | Schomburg et al. | 73/141 |
| 4,201,081 | 5/1980 | Bonomo | 73/141 |
| 4,203,318 | 5/1980 | Yorgiadis | 73/862.635 |
| 4,364,280 | 12/1982 | Kutsay | 73/862.635 X |
| 4,640,138 | 2/1987 | Meyer et al. | 73/862 |
| 4,644,803 | 2/1987 | Ward | 73/862 |
| 4,768,382 | 9/1988 | Varrese | 73/715 |

*Primary Examiner*—Benjamin R. Fuller
*Assistant Examiner*—Jewel V. Thompson
*Attorney, Agent, or Firm*—Westman, Champlin & Kelly, P.A.

[57] ABSTRACT

A load transducer adapted to measure a load force applied to a load anvil. The load transducer including a base and a relatively rigid bridge coupled to the base and load anvil to floatably support the load anvil so that the load anvil moves relative to the rigid base proportional to an applied load. The transducer including a sealable chamber enclosed by surfaces of the load anvil, bridge and base and adapted to be filled with a flowable medium within the sealed chamber.

20 Claims, 11 Drawing Sheets

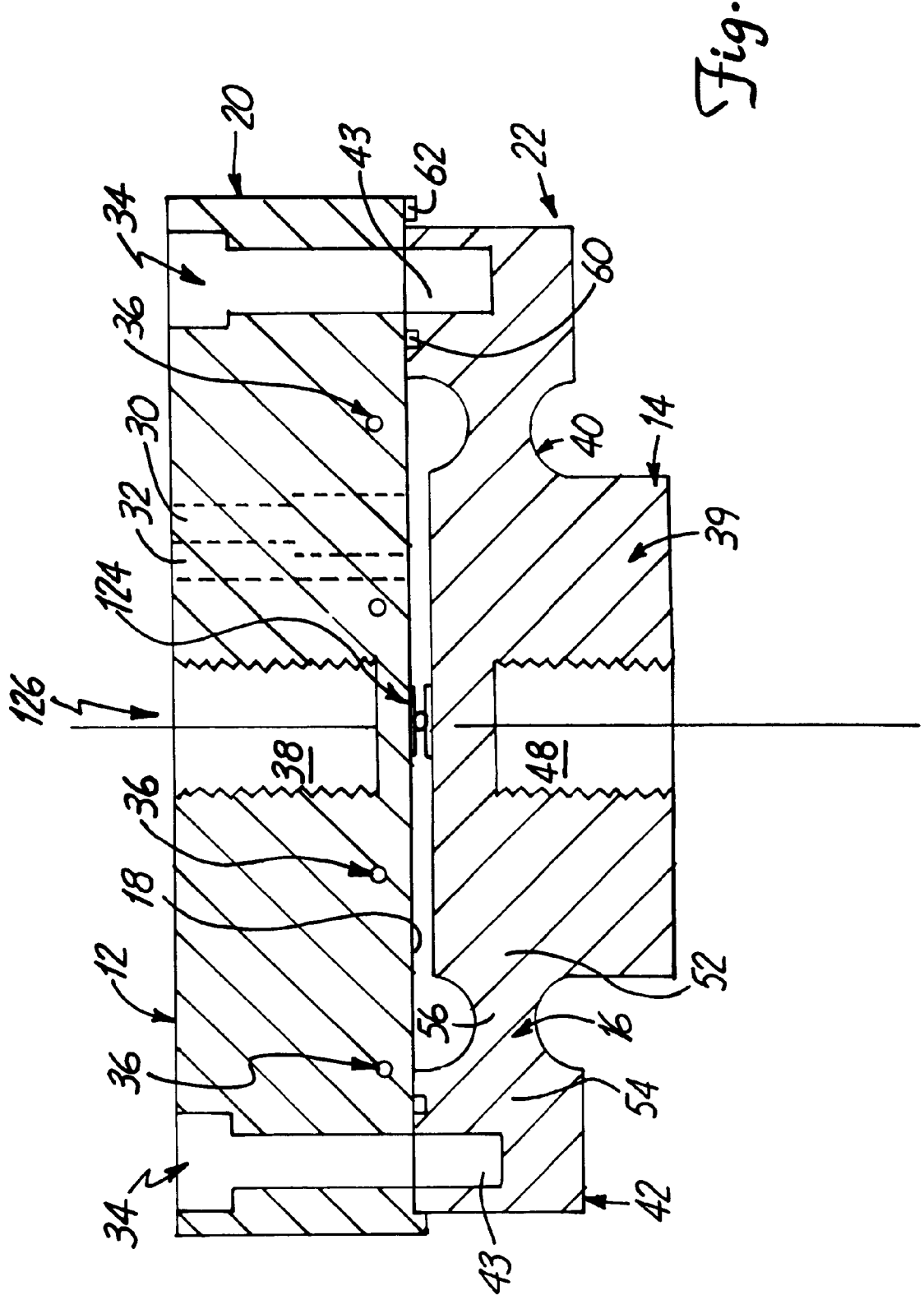

LOAD TRANSDUCER

BACKGROUND OF THE INVENTION

The present invention relates to a load transducer for measuring applied loads and has application in testing apparatus. In particular, the present invention relates to a load transducer which has application for high load applications.

Load transducers are known which measure loads applied to a load anvil and have particular application for operation in testing apparatus or equipment. Load transducers may be used for repeat loads measurements for loads applied to test specimens in a testing apparatus. It is desirable that such transducers have sufficient operating life with repeatable output for providing a reliable device which does not require constant calibration and which can withstand cyclical use without fatigue. It is also desirable that load transducers provide accurate load measurements which are not degraded by off-axis force introduced to the load anvil.

Load transducers may be used in testing apparatus for both compression and tension measurements. Thus, it is desirable to provide a single reliable load transducer that may be used to measure both tension force and compression force applied to a test specimen which may be adapted for use for high load applications.

SUMMARY OF THE INVENTION

The present invention relates to a load transducer adapted to measure a load force applied to a load anvil. The load transducer includes a base and a relatively rigid bridge coupled to the base and load anvil to floatably support the load anvil so that the load anvil moves relative to the rigid base proportional to an applied load. The transducer includes a sealable chamber enclosed by surfaces of the load anvil, bridge and base and adapted to be filled with a flowable medium within the sealed chamber.

BRIEF DESCRIPTION OF THE DRAWINGS

FIG. 12 is an alternate embodiment of a load transducer.

DETAILED DESCRIPTION OF THE PREFERRED EMBODIMENTS

Figure 1:
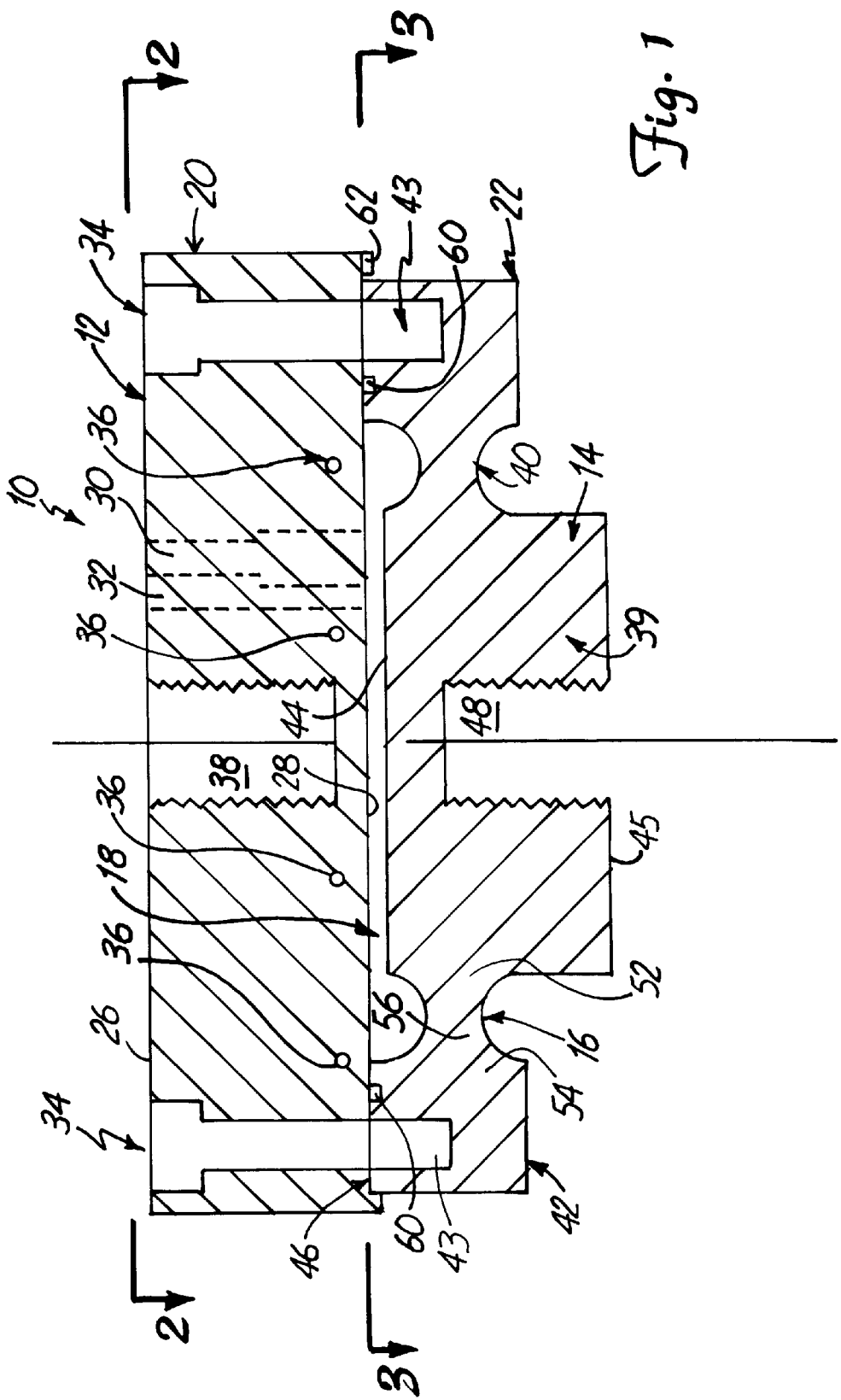
FIG. 1 is a cross sectional view of an embodiment of a load transducer of the present invention.

The present invention relates to an improved load transducer 10 for measuring loads. FIG. 1 is a cross-sectional view of an embodiment of the load transducer 10 of the present invention. As shown, transducer 10 includes a rigid base 12, a load anvil 14, a bridge 16 and a chamber 18. Bridge 16 is formed of a relatively rigid member and floatably supports the load anvil 14 relative to the base 12. A load is applied to the load anvil 14 which flexes bridge 16 and moves load anvil 14 relative to base 12 proportional to the applied load.

Chamber 18 is coupled to load anvil 14 and is enclosed by the bridge 16, load anvil 14 and base 12. The chamber 18 is filled with a flowable medium, such as a fluid, semi-fluid, gas or gel material. In one embodiment of the invention shown in FIG. 1, the flowable medium provides a transducer to convert the movement of the load anvil 14 to an alternate form for measurement. In particular, the volume of chamber 18 changes proportional to the magnitude of the load applied to anvil 14 which alters the pressure of the medium in the chamber 18. The pressure differential of the medium in chamber 18 is measured for calculating the magnitude of the applied load as will be explained.

Figure 2:
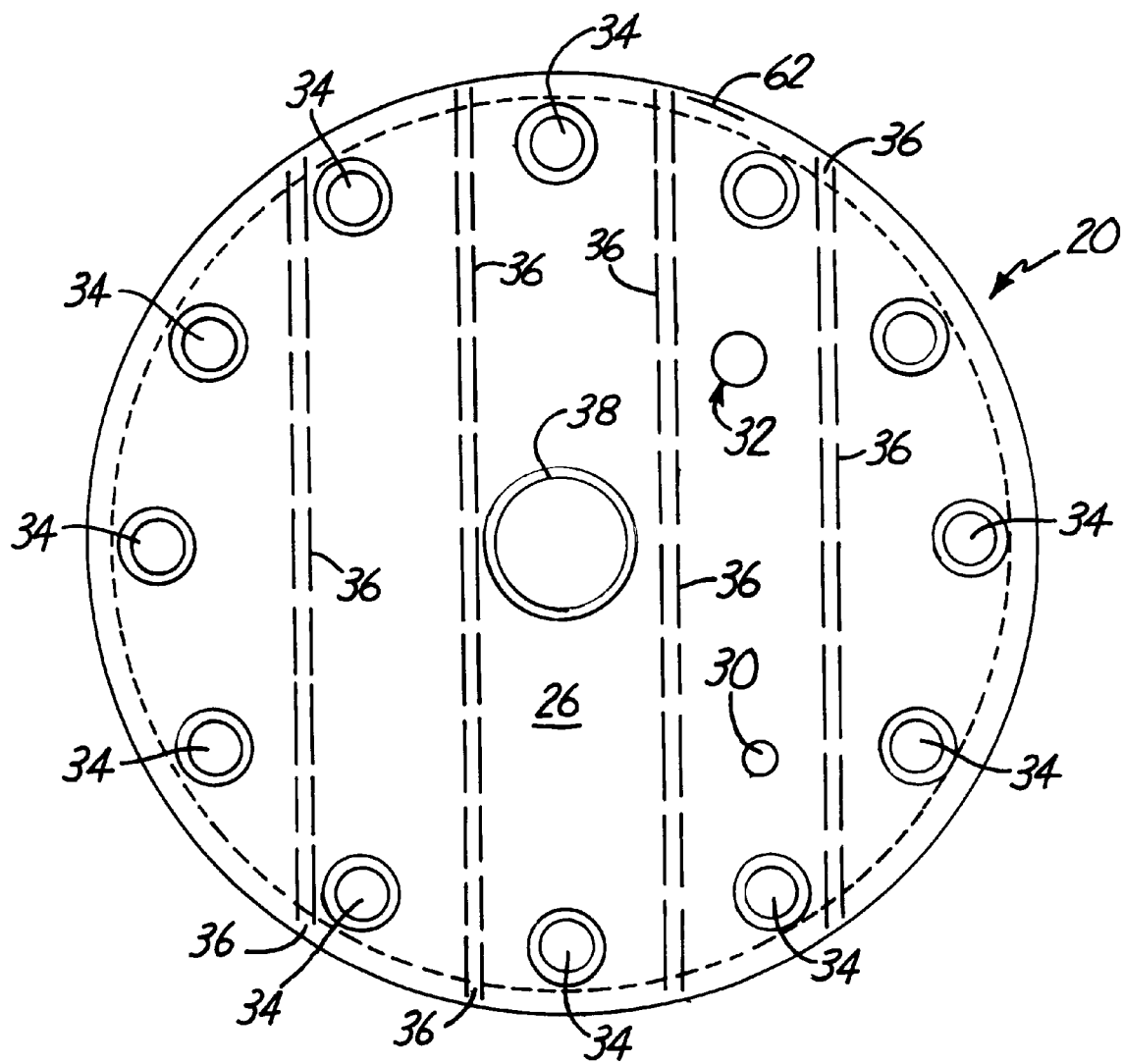
FIG. 2 is a top plan view of an upper face of a fixture plate of the load transducer of FIG. 1.

In the embodiment of the transducer 10 illustrated in FIG. 1, the base 12, load anvil 14 and bridge 16 are collectively formed by a fixture plate 20 and an actuator plate 22 coupled together. As illustrated in FIGS. 1–2, plate 20 is formed of a truncated cylindrical member having opposed circular faces 26, 28. The cylindrical plate includes bores 30, 32 which extend through the cylindrical member between faces 26, 28 as will be explained. A plurality of countersunk fastener holes 34 extend through plate 20 between opposed faces 26, 28. The fastener holes 34 are positioned at spaced intervals about the perimeter of plate 20 to fasten fixture plate 20 to actuator plate 22 for operation. In the embodiment shown a plurality of spaced transverse channels 36 are included for temperature control as will be explained. A threaded central bore 38 is included for fastening the load transducer 10 to a fixture (not shown) for operation.

Figure 3:
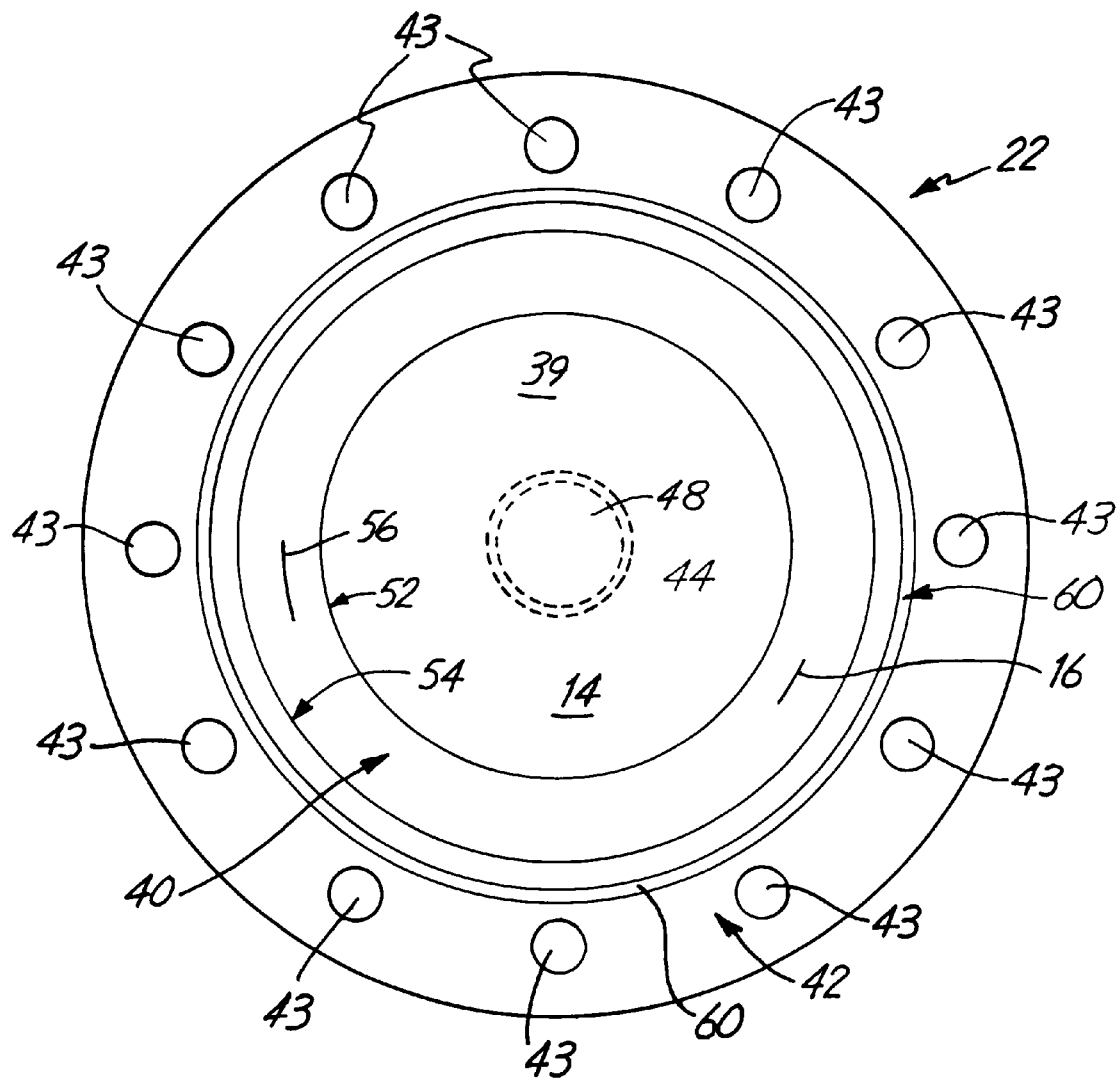
FIG. 3 is a top plan view of an upper face of an actuator plate of the load transducer of FIG. 1.

As illustrated in FIGS. 1 and 3, actuator plate 22 is formed of a circular shaped member having a cylindrical center portion 39, an annular 40 portion and an outer perimeter flange 42. Annular portion 40 is coupled between center portion 39 and flange 42. Center portion 39 defines load anvil 14 and annular portion 40 defines bridge 16. Plate 22 is coupled to fixture plate 20 at flange 42 via fastener members (not shown) extending through fastener holes 34 of plate 20 and cooperating holes 43 on flange 42. Flange 42 of plate 22 and plate 20 cooperatively form the base 12 of the transducer 10.

Center portion 39 of plate 22 forming load anvil 14 includes opposed faces 44, 45. Face 44 is recessed from flange surface 46 coupled to plate 20 to form chamber 18 between plates 20, 22 enclosed by base 12, load anvil 14 and bridge 16. Face 45 includes a central threaded bore 48 to couple a test specimen to the load anvil 14 for testing. Bridge 16 movably couples the load anvil 14 to base 20 to floatably support anvil 14 relative to base 12. Preferably, as shown, annular portion 40 forming bridge 16 includes opposed inner and outer perimeter edges 52, 54 coupled to the center portion 39 forming load anvil and flange 42 of base 12, respectively and has a reduced thickness waist section 56 between inner and outer perimeter edges 52, 54. The thickness of the reduced thickness waist section 56 is designed to allow the desired flexure of the anvil 14 relative to base 12 and the thickness of the perimeter edges 52, 54 is sufficient to secure the bridge 16 to the load anvil 14 and flange 42 of base 12, respectively. Preferably as illustrated in FIG. 1, bridge 16 has an hour-glass shaped cross-section defining the reduced thickness waist section 56.

Figure 4:
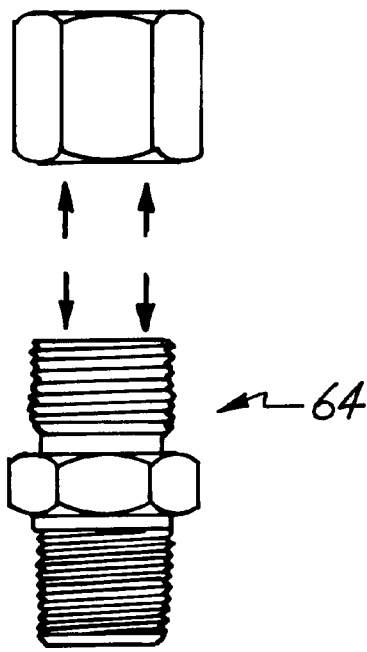
FIG. 4 is an embodiment of a threaded closure for sealing a chamber of the load transducer of FIG. 1.

As previously explained, chamber 18 is formed between plates enclosed by walls formed by base 12, load anvil 14 and bridge 16. A seal channel 60 extends circumferentially about flange 42 to house a seal for sealing chamber 18 for operation. An outer lip 62 illustrated in FIGS. 1–2 extends about the perimeter of fixture plate 20 for proper alignment of plates 20, 22 for assembly. Chamber 18 is filled with a flowable medium for operation through bore 30 or 32 coupled to chamber 18. Preferably, medium in chamber 18 is pressurized as will be explained. Preferably, bores 30, 32 are internally threaded and after chamber 18 is filled, holes 30, 32 are closed via a threaded closure 64 as illustrated in FIG. 4 to define a sealed chamber 18 for operation as will be explained.

Figure 5:
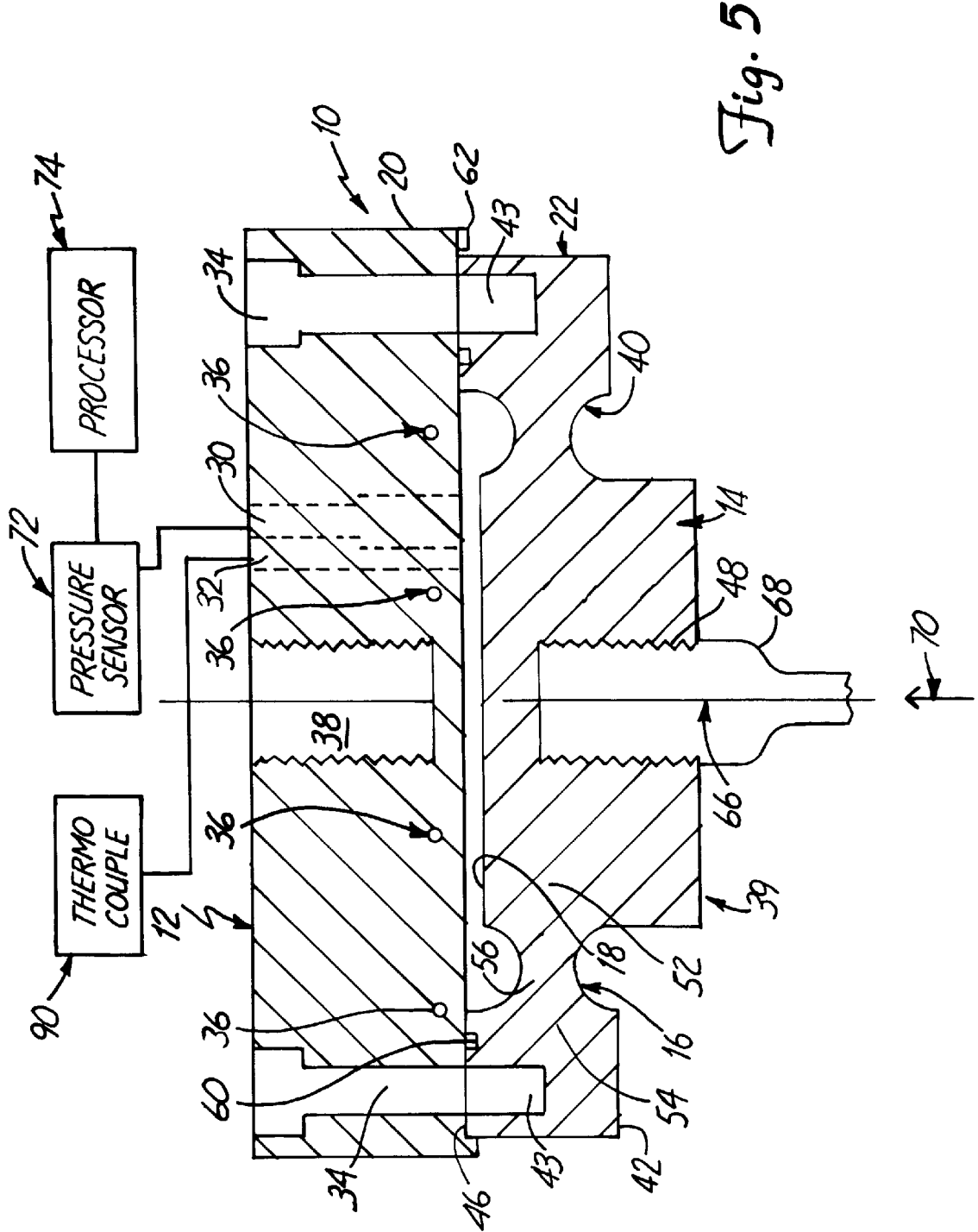
FIG. 5 is a cross-sectional view of the load transducer of the embodiment of FIG. 1 actuated via a compressive load applied to the load anvil.

As illustrated in FIG. 5, a load is supplied to the load anvil 14 along a load axis 66. Bridge 16 is aligned concentric with the load axis 66 to support the load anvil 14 for deflection proportional to an applied load. For operation, fixture plate 20 of base 12 is rigidly supported while a load is supplied to anvil 14. Force applied to load anvil 14 deflects or moves the load anvil 14 relative to rigid base 12 via the bridge 16. Since the chamber is sealed, and preferably filled with a pressurized medium, the fluid or flowable medium supports the applied load proportional to the surface area against which the medium acts for a compression load applied to the load anvil 14. Pressure changes of the medium in chamber 18 are measured and correlated to a load measurement. Bridge 16 is formed of a relatively strong material to support the load in combination with the medium in chamber 18 for controlled deflection for measurement.

The transducer 10 may be used to measure compression or tension force applied generally along load axis 66. A compressive force is applied to a test specimen 68 coupled to threaded bore 48 of load anvil 14 in the direction of arrow 70 which forces load anvil in a similar direction via flexure of bridge 16 to reduce the enclosed volume of chamber 18. The reduced volume increases the pressure of the medium in chamber 18. The magnitude of the pressure change is used to measure the load force. A pressure sensor 72 shown schematically is used to detect pressure change in chamber 18. In particular, sensor head (not shown) is positioned within chamber 18 through hole 30 or 32 sealed via threaded closure 64 to transmit an output signal corresponding to the pressure change to a processor 74 to calculate the load corresponding to the output signal.

Figure 6:
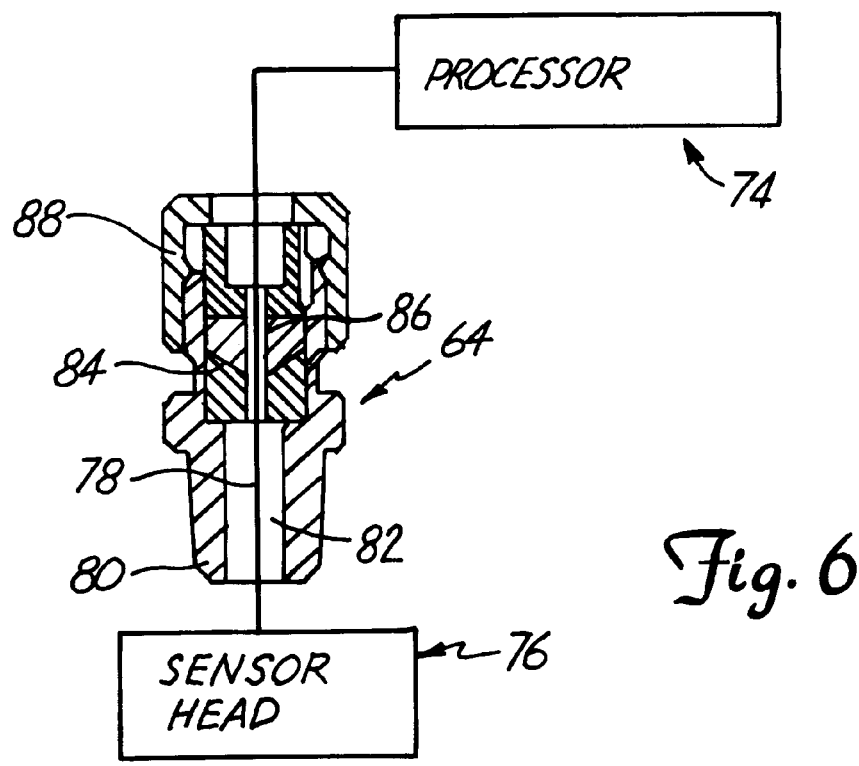
FIG. 6 is a cross-sectional view of a threaded closure having transmission wires sealably extending therethrough.

Preferably, as illustrated in FIG. 6, sensor head 76 (illustrated schematically) is coupled to processor 74 via transmission wire 78 extending through threaded closure 64. FIG. 6 is a cross-sectional view of an embodiment of a threaded closure 64 for sealing chamber 18 and having wires extending therethrough for measurement in chamber 18. As shown closure 64 includes a threaded body 80 having a central channel 82 extending therethrough. Sealing member 84 having a wire channel 86 is housed in channel 82. Cap 88 is threaded about an outer portion of body 80 to compress sealing member 84 to seal against wires 78 to provide a sealable closure having transmission wires 78 extending therethrough.

Figure 7:
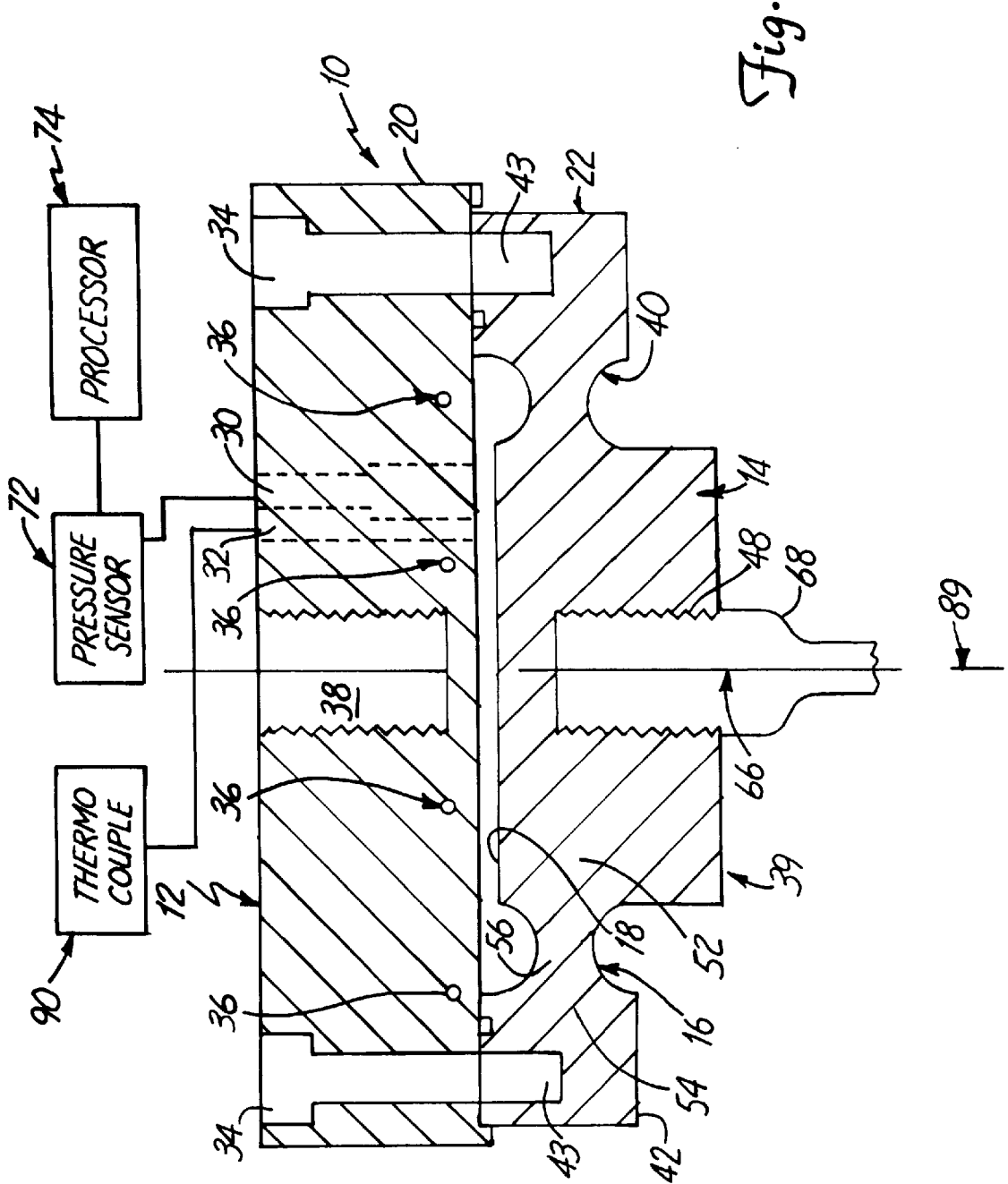
FIG. 7 is a cross-sectional view of the load transducer of the embodiment of FIG. 1 actuated via a tension load applied to the load anvil.

As illustrated in FIG. 7, a tension load is applied to a test specimen 68 coupled to threaded bore 48 of load anvil 14 in a direction of arrow 89 along load axis 66 which moves load anvil 14 in the same direction via flexure of bridge 16 to increase the volume of chamber, thus reducing the pressure of chamber 18. The pressure change is used to measure the load force. Preferably, medium in chamber 18 is pre-pressurized to measure a positive pressure and not a vacuum pressure, as previously explained. The medium is pressurized so that pressure of the medium in chamber 18 will not be below ambient for a tension load applied in the operating range of the transducer. The pressure change is correlated to a load force via processor 74. Medium is pressurized in chamber 18 by filling the chamber 18 while a tension load is supplied to anvil 14 to increase the volume of the chamber 18. After chamber 18 is filled and sealed, the tension load is released so that the filled chamber 18 is pressurized.

Preferably, the present invention may be used to measure relatively high load forces. However, it should be understood that the invention is not limited to high load applications. For high load application, the fixture plate 20 and actuator plate 22 are formed of a high strength fatigue rated material such as a stainless steel material to define a relatively stiff flexure or bridge for supporting high load forces on anvil 14. The chamber 18 is filled with a high modulus medium so that the medium is substantially incompressible. The high modulus medium is pre-pressurized in chamber 18 to approximately 1,500–2000 psi. Thus the stiff bridge and pressurized high modulus medium in chamber 18 stably support a load applied to anvil for measurement. An example medium is a silicone gel material, however, alternate flowable mediums may be used depending upon the application.

Prior to operation of the device, the device is calibrated to provide measured load readings based upon sensed pressure differentials. To calibrate the device, various known loads are supplied to the load anvil 14. The pressure change is measured for each known load. The known load value and corresponding pressure measurement is inputted to the processor 74 to establish pressure-load calibration data for the transducer for a given load range. After the device is calibrated, an unknown load may be applied and pressure change measured. The pressure change is used to determine the applied load from the calibration data for the device. Preferably, the relationship between pressure difference and load should be linear for a desired operating range and thus the chamber medium should have linear compressibility characteristics over a desired operating range.

During operation of the device, the temperature of the pressurized medium may rise, affecting the properties of the medium and thus affecting pressure measurements of the medium and interfering with calibrated load measurements. Cooled liquid may be circulated through transverse channels 36 on plate 20 to maintain desired operating temperature ranges. Alternatively, the temperature of the medium in chamber 18 may be measured and the measured temperature and thermodynamic properties of the medium in the chamber 18 can be used to compensate for temperature influence or error to the load measurement. The temperature of the chamber 18 may be measured by a thermocouple 90 (shown schematically) extending into chamber 18 through bore 30 or 32 and sealed via threaded closure 64 having a sealable wire channel as illustrated in FIG. 6.

Figure 8:
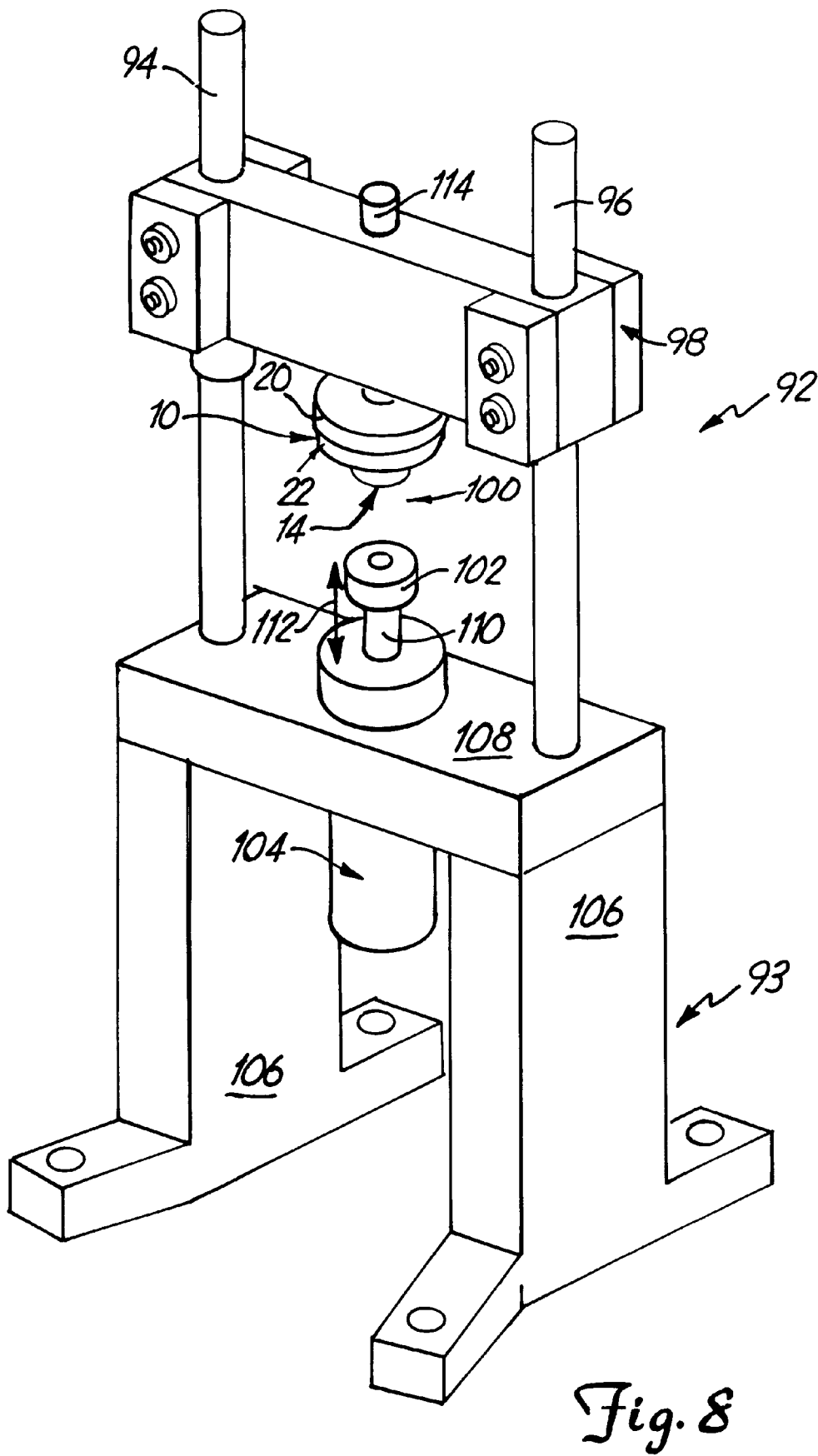
FIG. 8 is an embodiment of a testing apparatus incorporating an embodiment of the load transducer of the present invention.

The load transducer of the present invention may be adapted for use in a load testing apparatus 92 as illustrated in FIG. 8. As shown the load testing apparatus 92 may be used to apply a compression or tension load to a test specimen (not shown). As shown, apparatus 92 includes a base 93, posts 94, 96, adjustable crosshead 98, upper and lower grips 100, 102 and an actuator 104. Upper and lower grips 100, 102 are supported to secure opposed ends of a test specimen (not shown) for load operations. Actuator 104 supplies a test load to a test specimen secured by upper and lower grips 100, 102.

Lower grip 102 is supported via base 93 which includes feet 106 and a table 108. Upper grip 100 is supported via crosshead 98 supported relative to table 108 via posts 94, 96 extending from table 108. Crosshead 98 is movably supported by posts 94, 96 to raise and lower crosshead 98 based upon the test space required. Lower grip 102 is coupled to drive rod 110 of actuator 104. Drive rod 110 moves as illustrated by arrow 112 to move lower grip 102 coupled thereto to apply a load to the test specimen (not shown). Upper grip 100 is formed by the load anvil 14 or alternatively may be separately formed and coupled to the load anvil 14. Fixture plate 20 of the transducer 10 is fixedly coupled to crosshead 98 via rod 114. Thus, as described, load supplied to the test specimen via actuator 104 is transferred to the load transducer 10 to measure the applied load to a test specimen (not shown).

Figure 9:
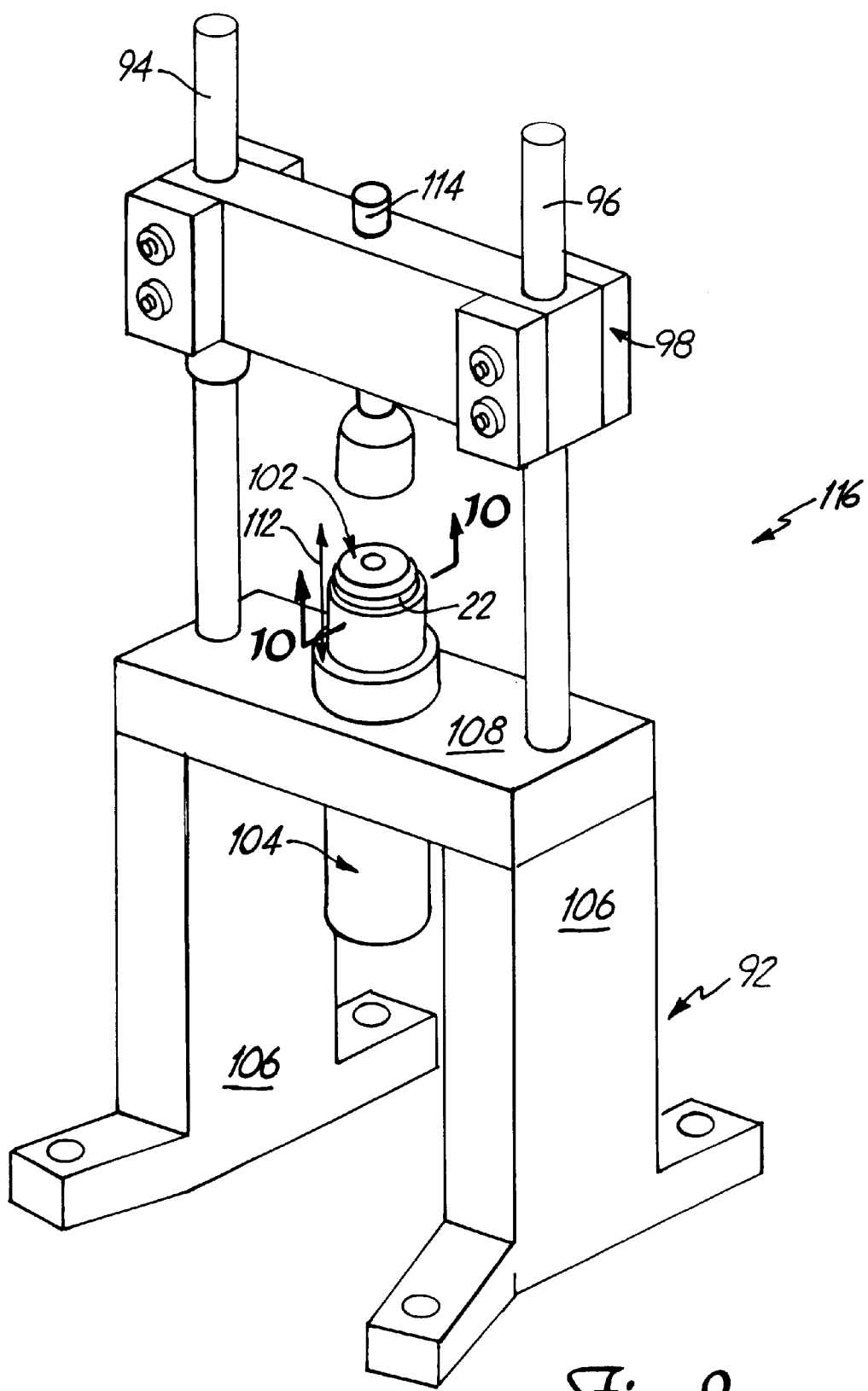
FIG. 9 is an alternate embodiment of a testing apparatus incorporating an embodiment of the load transducer of the present invention.
Figure 10:
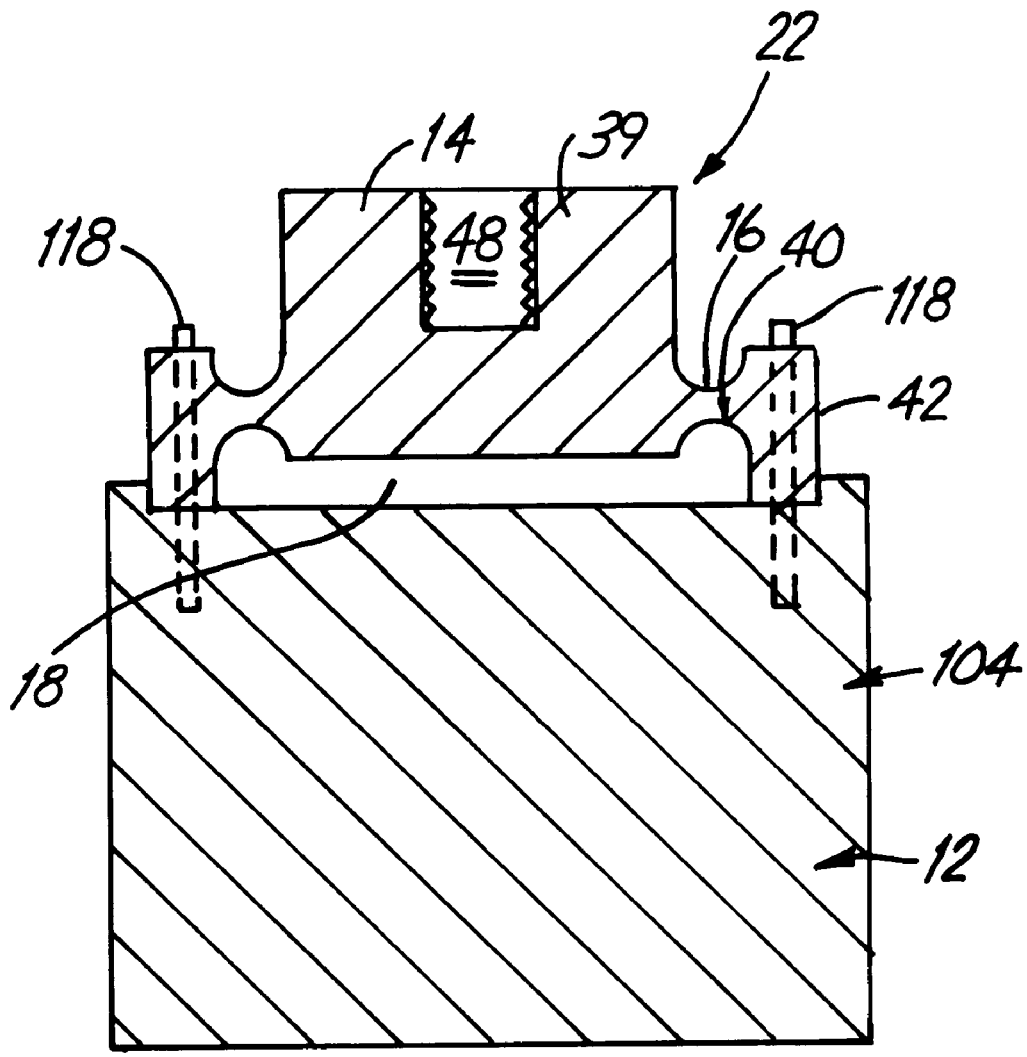
FIG. 10 is a cross-sectional view as taken along line 10—10 of FIG. 9.

Alternatively as illustrated in FIGS. 9–10 in another embodiment of a load testing apparatus 116, where like numbers are used to identify like parts of apparatus 92 previously illustrated, load transducer 10 may be formed integrally with the actuator 104. In particular, plate 20 of the load transducer is formed via a portion of drive member of actuator 104 and plate 22 is fastened thereto via fasteners 118 to cooperatively form the load transducer. It should be understood that, although round plates are illustrated for forming the load transducer, the invention is not limited to round plates and alternately shaped plates or members may be used.

In the load transducer of the present invention, the bridge 16 provides a relatively stable support for load anvil 14 which flexually isolates a load from rigid base 12 for measurement. The stiffness of the bridge and stiffness of medium in chamber 18 are designed to reduce off-axis movement. The device previously described provides a measured output which is not significantly degraded or affected by off-axis movement so that adjustments to measurements are not required to compensate for off-axis movement. The bridge 16 supports an applied load and provides an output proportional to the applied load which is not degraded by friction or hysteresis. The integral bridge 16 supporting the load anvil 14 relative to base 12 does not require sliding components which introduces friction into the system degrading load measurement.

Figure 11:
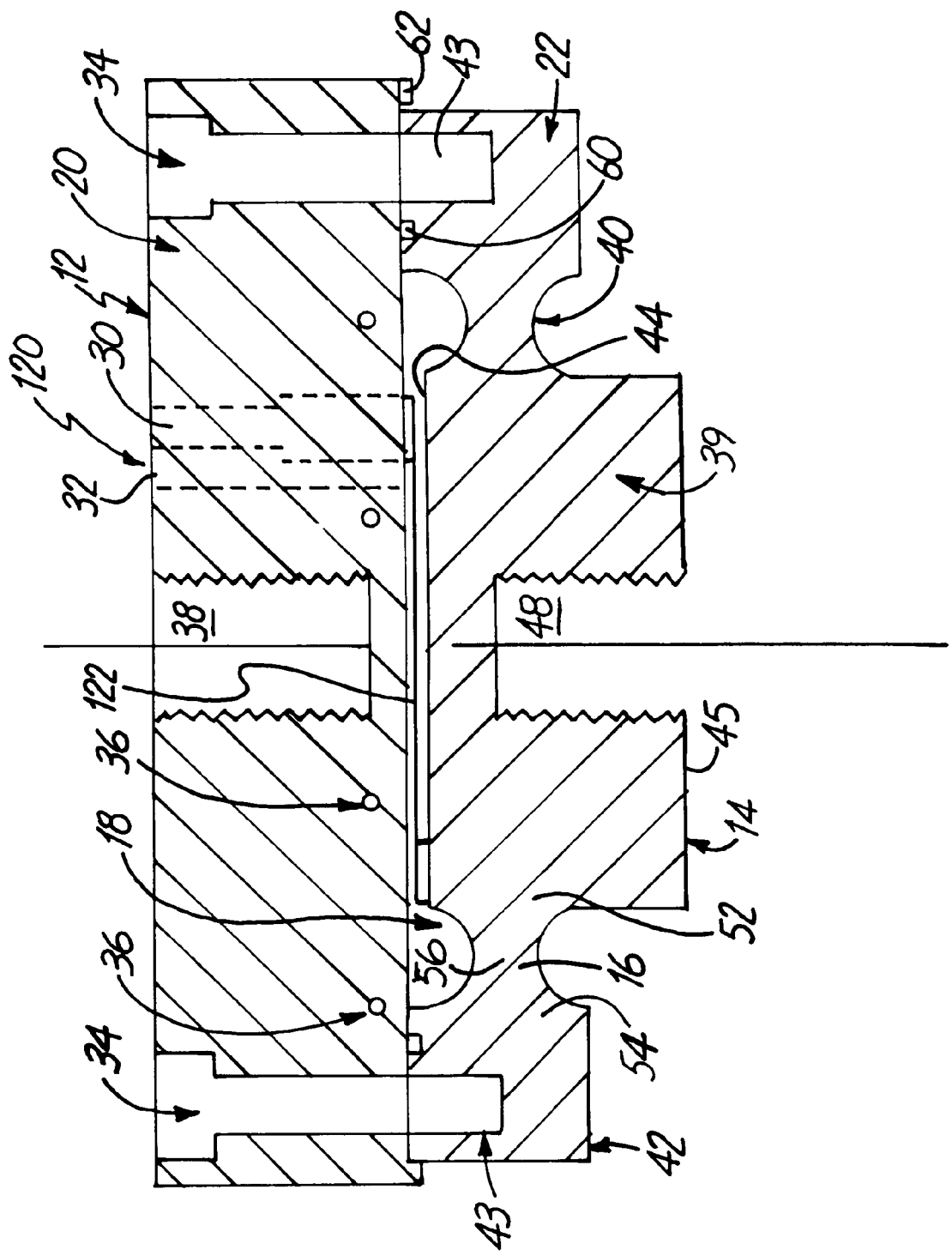
FIG. 11 is an alternate embodiment of a load transducer.

FIGS. 11–12 illustrate alternate embodiments of a load transducer of the present invention. Like numbers are used to refer to like parts in the load transducer illustrated in the previous FIGS. In each of the alternate embodiments, linear strain gauges (not visible) are supported on beams relative to the load anvil 14 and base 12 to measure deflection of the load anvil 14 as an alternative to measuring pressure changes in chamber 18. In each embodiment illustrated in FIGS. 11–12, chamber 18 is filled with a flowable medium for supporting a load and strain gauges measure deflection of load anvil for an applied load. The measured strain is then correlated to a measured load based upon calibration of the transducer similar to that previously described.

In particular, in the embodiment of the load transducer 120 illustrated in FIG. 11, strain gauges are supported on transverse beam 122 in chamber 18 having ends coupled to load anvil 14 and base 12 and deflectable via movement of load anvil 14. Alternatively, gauges may be supported on a longitudinal beam or column 124 extending between load anvil 14 and fixture plate 20 of base 12 as shown in the embodiment of transducer 126 illustrated in FIG. 12. Beam or column 124 is flexed via movement of load anvil for measuring the applied load based upon the measured strain of strain gauges supported by column 124. Load anvil 14 is supported by bridge 16 and the chamber medium supports a load proportional to the surface area against which the medium acts. Strain measurements are coupled to a processor not shown in FIGS. 11–12 for load output.

Thus, as described, the load transducer provides a device which supports a load without friction engaging components which affect measurement accuracy. The device is also adaptable for high load applications. The bridge of the present invention is designed based upon operating ranges to support loads in the operating range without stressing the bridge beyond the limits of the material.

Although the present invention has been described with reference to preferred embodiments, workers skilled in the art will recognize that changes may be made in form and detail without departing from the spirit and scope of the invention.

What is claimed is:

1. A load transducer adapted to measure a load force comprising:

a rigid base;

a load anvil having an outer perimeter and a first load surface and a second opposed surface spaced from the base to form a gap therebetween;

a bridge formed of a relatively rigid body having first and second spaced closed edges, the first edge being operably connected to the load anvil about the perimeter of the load anvil and the second edge being operably connected along the length thereof to the rigid base the bridge floatably connecting the load anvil relative to the rigid base so that the load anvil moves in the gap between the load anvil and the rigid base proportional to an applied load;

a sealable chamber formed in the gap between the second load anvil surface and base and having walls formed by surfaces of the load anvil, bridge and base and adapted to be filled with a flowable medium within the sealed chamber for supporting a load applied to the load anvil; and p1 a transducer means for providing a measurable output proportional to the load applied to the load anvil.

2. The load transducer of claim 1 wherein flowable medium in the chamber defines the transducer means for providing a measurable output proportional to the load applied to the load anvil.

3. The load transducer of claim 2 and including a pressure sensor device operably coupled to the chamber for measuring a pressure differential of the medium.

4. The load transducer of claim 1 wherein the transducer means includes:

a strain gauge; and a strain gauge support operably coupled to the load anvil and base for measuring movement of the load anvil relative to the base.

5. The load transducer of claim 1 wherein the load transducer is formed of:

a first plate and a second plate operably coupled to form the chamber, the base being formed integrally with the first plate and the bridge and load anvil being formed integrally with the second plate.

6. The load transducer of claim 5 wherein the first and second plates are cylindrical members.

7. The load transducer of claim 5 wherein the load anvil and bridge are formed of a steel material.

8. The load transducer of claim 5 wherein the bridge is formed of an annular member and includes a reduced diameter waist portion between spaced first and second edges for movably supporting the load anvil relative to the base.

9. A load transducer adapted to measure a load force comprising:
  a rigid base;
  a load anvil adapted to support an applied load and having a first load surface and a second opposed surface spaced from the first load surface and from the base to form a gap therebetween;
  a relatively rigid bridge operably connected to the rigid base and load anvil to floatably connect the load anvil relative to the rigid base so that the load anvil moves in the gap between the load anvil and the rigid base proportional to an applied load; and
  a sealable chamber formed in the gap between the second load anvil surface and base and having walls formed by surfaces of the load anvil, bridge and base, and adapted to be filled with a flowable medium within the sealed chamber for providing a measurable output proportional to movement of the load anvil relative to the base.

10. The load transducer of claim 9 wherein the chamber is filled with a pressurized flowable medium for measuring a positive pressure change above ambient pressure for both tension and compression loads applied to the load anvil.

11. The load transducer of claim 9 wherein the chamber is filled with a high modulus medium.

12. The load transducer of claim 9 wherein the medium is a silicone gel material.

13. The load transducer of claim 9 including a plurality of cooling channels proximate to the chamber.

14. The load transducer of claim 9 and including a pressure sensor device operably coupled to the chamber for measuring pressure of the flowable medium.

15. The load transducer of claim 9 wherein the load anvil and bridge are integrally formed of a steel material.

16. The load transducer of claim 9 wherein the bridge includes a reduced diameter waist section for movably supporting the load anvil relative to the base.

17. A method for measuring load force comprising steps of:
  providing a load transducer having a load anvil movably coupled to a rigid base via a relatively rigid bridge operably connected to the load anvil and base, and having a sealable chamber having walls formed by surfaces of the base, bridge and load anvil;
  filling the chamber with a flowable medium and sealing the filled chamber;
  providing a measurement device coupled to the chamber for measuring pressure changes of the medium in the chamber based upon deflection of the bridge; and
  calibrating the output from the measurement device based upon known loads applied to the load anvil for correlating output to a load value for measuring unknown loads.

18. The method of claim 17 comprising step of:
  applying a tension load to load anvil to expand the chamber while filling the chamber with a flowable medium and sealing the filled chamber prior to releasing the tension load to provide a pressurized chamber for load measurements.

19. The method of claim 17 comprising step of:
  measuring the temperature of the medium in the chamber for temperature compensation based upon thermodynamic properties of the medium in the chamber.

20. The method of claim 19 comprising step of:
  adjusting the temperature of the medium in the sealed chamber by supplying cooling fluid through fluid channels proximate to the chamber.

* * * * *